(12) United States Patent
Moharram

(10) Patent No.: US 6,704,287 B1
(45) Date of Patent: Mar. 9, 2004

(54) ENABLING SMART LOGGING FOR WEBTONE NETWORKS AND SERVICES

(75) Inventor: Omayma El-Sayed Moharram, Carleton Place (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/386,460

(22) Filed: Aug. 31, 1999

Related U.S. Application Data

(60) Provisional application No. 60/121,950, filed on Feb. 26, 1999.

(51) Int. Cl.[7] .................................................. H04J 1/16
(52) U.S. Cl. ...................... 370/242; 370/248; 370/249; 370/250; 370/252; 370/410; 370/522; 714/712; 714/750
(58) Field of Search ................................. 370/241–242, 370/244–245, 248–250, 252, 251, 410, 522–523; 714/712, 749–751, 752, 821; 709/250

(56) References Cited

U.S. PATENT DOCUMENTS 6,269,083 B1 * 7/2001 Nagata et al. .............. 370/248

* cited by examiner

*Primary Examiner*—Dang Ton
*Assistant Examiner*—Inder Pal Mehra
(74) *Attorney, Agent, or Firm*—Max R. Wood; Ogilvy Renault

(57) ABSTRACT

Methods and apparatus for providing enhanced telecommunications services troubleshooting in multi-carrier telecommunications networks are described. Troubleshooting information gathering is initiated by launching a "Test Service Call with a Travelling Log". The Travelling Log acquires data from enabled intelligent network elements in each carrier network through which a Test Service Call is routed. The Travelling Log entries permit information posted to the Travelling Log to be relayed back to network management personnel. Network management personnel equipped with network management system terminals or customers, as appropriate, can initiate the Test Service Call with Travelling Log. The enabled intelligent network elements may include any element in NB/BB PSTN/ISDN with TDM, ATM, Internet, or SONET transport capabilities. The advantage is a cost-effective enhanced troubleshooting information retrieval system operable across service delivery carriers in multi-carrier telecommunications networks.

28 Claims, 3 Drawing Sheets

ENABLING SMART LOGGING FOR WEBTONE NETWORKS AND SERVICES

This application claims the benefit of U.S. Provisional Application No. 60/121,950 filed Feb. 26, 1999.

TECHNICAL FIELD

The invention relates generally to enhanced multi-carrier telecommunications service assurance and network testing and, in particular, to a method and apparatus for enabling multimedia services troubleshooting across multi-carrier telecommunications networks with multi-transport technologies and capabilities.

BACKGROUND OF THE INVENTION

Webtone is an electronic signal that announces the immediate availability of multimedia services including telephony, web pages, electronic mail (e-mail), facsimiles, remote access to business services and any other kind of digitized information over a Public Carrier Network. Digitized information for such services are, or will become, accessible from wireline and wireless terminals. These services are supported by the fiber Synchronous Optical Network (SONET) core network with feature rich edge switching nodes that form the base for a Webtone network. A significant challenge is to provide the testing and troubleshooting mechanisms for the Webtone network for ensuring quality assurance for such services. Quality of service (QoS) is an important issue and it is one of the major hurdles to be overcome before such services gain widespread acceptance. Reliability of the network in general and availability of enhanced services are critical to Webtone success.

Webtone requires an integrated interworking of predominantly voice networks such as the Public Switched Telephone Network (PSTN), predominantly data networks such as the Internet, and narrowband/broadband integrated services digital networks (ISDN). This requirement has inspired the development of protocols such as Voice over Internet Protocol (IP), IP over Asynchronous Transfer Mode (ATM), Voice over ATM, IP over Synchronous Optical Network (SONET), etc. These developments have also promoted the concept of an Internet Phone™, which is an implementation of Voice over IP. Providing QoS is an issue for voice services across an IP-based network for Internet Phones™. The issue of QoS is further complicated when Voice over IP is passed to a Plain Ordinary Telephone Service (POTS) network, or vice versa. Troubleshooting multimedia services such as voice, data, video or audio in multi-carrier telecommunications networks is an issue that has not been addressed.

An expanding telecommuting workforce requires that these issues be addressed now more than ever. There is also a need to integrate services troubleshooting and QoS provisioning across multi-carrier networks to provide seamless telecommunications in a converging marketplace.

The Public Switched Telephone Network

In the Public Switched Telephone Network (PSTN), user telephone terminals and facsimile machines are connected to telephone switches. The telephone switches (which include Central Offices (COs) for wireline communications and Mobile Switching Centers (MSCs) for wireless communications) are specialized computerized switches engineered for the provision of intelligent telephone services to subscribers. The switches are interconnected through trunks, on which voice and voice-grade data are carried. The switches are also interconnected through a common channel signaling (CCS) network, typically a Signaling System No. 7 (SS7) network, which is a specialized fault-tolerant data communications network, principally used for signaling messages that control call setup and maintenance.

The PSTN is a multi-carrier network in which a plurality of interconnected and inter-working networks cooperate to deliver services. The networks in the PSTN include analogue Plan Ordinary Telephone Services (POTS) networks, narrowband (NB) Integrated Services Digital Network (ISDN), and broadband (BB) ISDN networks, based on Asynchronous Transfer Mode (ATM) transport facilities. A simple two-party call in most cases involves several telephone switches; one or more of which may be located in any one of the different networks. In combination, the switches form a complex distributed processing environment for the delivery of telecommunications services such as voice, data, video, and audio. All of the switches are presently enabled to cooperate in the delivery to customers of certain basic services, such as the provision of dial tone, ringing on a called line, and establishing connections between two or more parties.

The Internet

The Internet is a network of elements such as IP hosts, hubs, intelligent hubs, IP switches, routers, bridges, gateways, network information databases, etc. All these elements have computing abilities and utilize protocols conforming to the Open System Interconnections (OSI) model of which the Transport Control Protocol over Internet Protocol (TCP/IP) is a widespread implementation. The Internet core is provided over redundant data links.

All information transported over the Internet, whether data, video, voice, or audio is parceled into TCP/IP packets, which are routed to an intended destination. The Internet is therefore a packet switched network. There is currently no provision for deterministic routing of TCP/IP packets over the Internet and, no provision for a guaranteed throughput of TCP/IP packets. The way the packets propagate over the Internet is by a store and forward method in which TCP/IP packets are sent between the network elements making up the Internet and are buffered at each network element in a queue awaiting processing. There is no guarantee of transmission of individual packets over the Internet but there are provisions for the re-transmission of incorrectly received packets and/or packets that are lost or discarded along the way.

The inherent non-deterministic routing of TCP/IP packets over the Internet complicates troubleshooting multimedia services. There are, however, troubleshooting applications available for verifying connectivity between network elements in the Internet. These applications provide connectivity checks at the physical layer, the link layer, and the network layer. These Internet applications provide network-wide information or service-specific information.

The Internet may be accessed using dedicated connections. Nonetheless, the most common access is provided by an Internet Gateway (IP GWY) at an edge of the Internet with links to the PSTN. The IP GWYs perform protocol conversion as required, to convert time division multiplexed data from the PSTN to TCP/IP format, and vice versa.

Multi-media Webtone Services Assurance

Webtone services such as Voice over Internet (VoIP) or Data over Internet (DoIP), and many others require much more than basic calls processing. The implementation of these services requires that specialized service applications be developed to operate on equipment from different vendors, and in a multi-carrier network that includes narrowband and broadband (NB/BB) carriers. Intelligent Network Elements (INEs) such as the service control points (SCPs), Intelligent Peripherals (IPs), service Gateways (GWYs), or Service Nodes (SNs) execute service applications and provide instructions to the NB/BB wireline or wireless switches for completing service calls. Each switch is involved only in executing basic call processing, which is interrupted at standardized breakpoints when a specialized service application needs be executed. On encountering such a breakpoint, the switch issues a service request to an INE that has the service application (e.g., an SCP in a narrowband intelligent telephone network or services server for narrowband (NB) and Broadband (BB) Internet/PSTN interworking), and waits for instructions.

For some services, the INE may initiate a call on its own by instructing switches to establish necessary connections between a calling and called parties. In addition to executing the service application, other INEs can perform certain switching functions (such as bridging calls) as well as a set of specialized functions (such as playing announcements, voice recognition and text-to-speech conversation). The SCPs are typically connected to switches via an NB/BB SS7 signaling network, while Service Nodes (SNs), and Intelligent Peripherals generally communicate with the switches via an ISDN Primary or Basic Rate Interface (PRI or BRI), which combines the signaling and voice paths on a single link. An Internet Gateway (IP GWY) communicates with the switches and SNs via the NB/BB SS7 network and with the SCPs via ISDN PRI.

Although this basic infrastructure is in place, no reliable tools have been developed for isolating end-to-end service problems when the establishment of a multi-carrier service call fails.

There is therefore a need for new enhanced cost-saving services testing and troubleshooting across telecommunications networks. There is also a need for new revenue-generating services fuelled by profitability. Profitability can be increased by providing new multi-carrier services, and by reducing the cost of service troubleshooting across multi-carrier network connections.

A protocol for end-to-end services testing and troubleshooting was described in Applicant's co-pending U.S. patent application Ser. No. 08/545,183 entitled TRAVELLING LOG FOR INTELLIGENT NETWORK TESTING, which is incorporated herein by reference. That application provides a specification of a protocol for a configurable Test Service Call with Travelling Log capability for multi-carrier intelligent networks (IN) and advance IN (AIN) telecommunications networks. It does not address the Internet/PSTN with ATM, SONET, and Ethernet technologies for multi-carrier telecommunications networks.

SUMMARY OF THE INVENTION

The invention provides methods and apparatus for enabling Webtone services testing and troubleshooting in a multi-carrier telecommunications networks which provide the services to customers or third party service providers.

The invention also provides Webtone services testing and troubleshooting for PSTN narrowband/broadband ISDN based on ATM, IP, and SONET transport technologies. The invention evolves the apparatus for enabling multimedia services testing and troubleshooting for multi-carriers within next generation networks.

The invention enables a Webtone Test Service Call with Travelling Log capability to permit network management personnel to identify faults in the network by simply launching a "Test Service Call with Travelling Log". The Travelling Log provides the network management personnel with data related to the "health" of each intelligent network element (INE) along the service call path. This end-to-end view of the service call path permits the network management personnel to identify any element(s) responsible for network trouble discovered by monitors or reported by customers. The Test Service Call with Travelling Log enables network management personnel to verify that Webtone originating or terminating service, or private service, is functioning correctly from a subscriber's point of view.

As the service call-related signaling messages travel through the multi-carrier network, information is posted to the Travelling Log in accordance with the specification of the Test Service Call Parameter and Travelling Log. Network management personnel for multi-carrier services troubleshooting may use the information posted to the TravellingLog.

A Test Service Call may be initiated in a number of ways. For example, network management personnel may initiate a Test Service Call. The network management personnel use a utility, such as a graphic user interface, from a management workstation in the multi-carrier network. The utility preferably gives the network management personnel a menu of options respecting the purpose of the Test Service Call and a format and medium for presenting information gathered by the Test Service Call. The utility may be configured to automatically initialize a Test Service Call Parameter and Travelling Log for the Test Service Call. Alternatively, the utility may permit the network management personnel to manually initialize the Test Service Call Parameter and Travelling Log. A Test Service Call may also be initiated by a customer who dials a predetermined digit sequence such as "*X", as described in Applicant's co-pending U.S. patent application Ser. No. 09/354,728 filed on Jul. 16, 1999 and entitled CUSTOMER SMART LOGGING FOR NEW TELECOMMUNICATIONS SERVICES.

As a control or data transfer (payload/bearer) signaling message associated with a Test Service Call propagates across the multi-carrier network, it may require protocol conversion at gateways or interfaces between different service delivery networks that operate under different protocols. In addition to protocol conversion, the Test Service Call Parameter and Travelling Log may require reconfiguration to ensure that appropriate information is posted to the Travelling Log by nodes in the different carrier networks.

The information posted to the Travelling Log in the control or data transfer (payload/bearer) signaling messages associated with a Test Service Call (such as signaling messages for call establishment, teardown, data transfer or query/response) may be stored and analyzed in any way that satisfies a purpose of the troubleshooting or information gathering. The type of analysis and display is dependent on the purpose of the Test Service Call and the telecommunications media available for the display.

The invention therefore provides a flexible tool for service call troubleshooting across telecommunications connections and the gathering of information in a multi-carrier telecommunications network, which enables the creation of new cost-effective troubleshooting tools as well as a delivery mechanism for many new customer services.

BRIEF DESCRIPTION OF THE DRAWINGS

The invention will now be described by way of example only, and with reference to the accompanying drawings, in which.

DETAILED DESCRIPTION OF THE PREFERRED EMBODIMENT

The invention relates to methods and apparatus for testing and troubleshooting in narrowband (NB)/broadband (BB) multi-carrier integrated network where telecommunications Webtone services involve intra-carrier and inter-carrier telecommunications. The Intelligent Network Elements (INEs) in the NB/BB networks are enabled with a Test Service Call capability to permit information to be retrieved from INEs in the path of a Test Service Call session. The Test Service Call capability may be used for troubleshooting failed or poor quality telecommunications services calls. The Test Service Call capability enables INEs to add information to a Travelling Log associated with call-related control or data transfer (payload/bearer) signaling messages. As Test Service Call messages traverse the network(s), invaluable information respecting INE state, services success or failure, QoS, and network congestion, for example, is retrieved from the telecommunications networks traversed.

Webtone Services Network Environment

Figure 1:
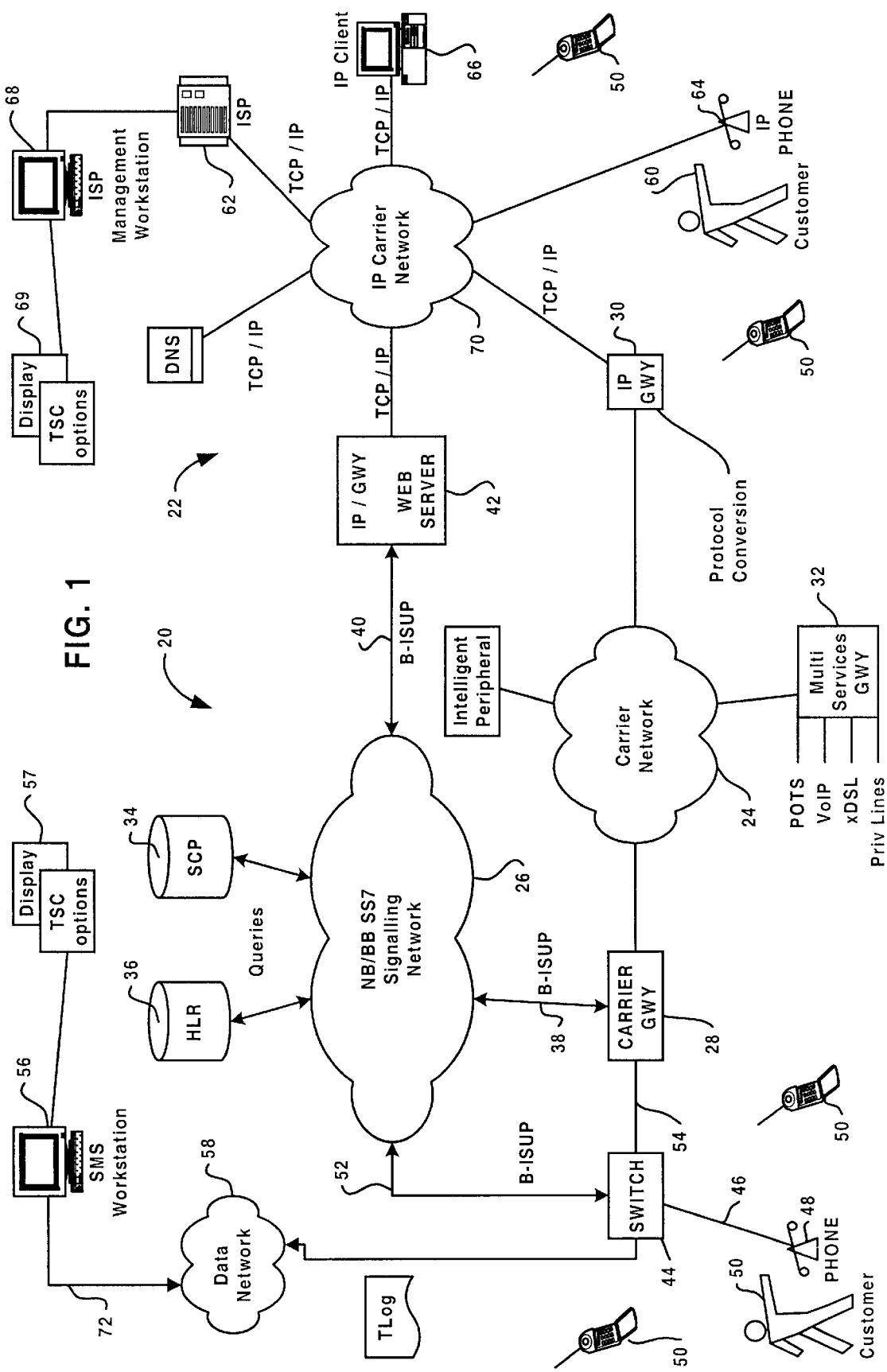
FIG. 1 is a schematic diagram depicting a multi-carrier telecommunications environment for providing Webtone services.

FIG. 1 is a schematic diagram depicting an exemplary multi-carrier telecommunications environment for providing Webtone services. The multi-carrier telecommunications environment includes a Public Switched Telephone Network (PSTN) 20 which provides voice and voice grade data services via wireline and wireless facilities well known in the art. The telecommunications environment also includes an Internet Protocol (IP) network 22 which supports services such as the Internet, the World Wide Web (WWW) and a plurality of related data services. The multi-carrier telecommunications environment also includes carrier networks 24 which may be, for example, Asynchronous Transfer Mode (ATM) or Synchronous Optical Networks (SONET) which are adapted to carry both narrowband services such as Plain Ordinary Telephone Service (POTS), data services such as Digital Subscriber Line (xDSL), Voice over Internet Protocol (VoIP), and proprietary services such as private trunks and lines. Access to the carrier network 24 is provided by a Time Division Multiplex (TDM) to ATM gateway 28, and IP gateway 30, a multi-services gateway 32 which supports a plurality of customer services. The ATM/IP core network facilities enable service call-related data transfer (payload/bearer) signaling and provides for service data transport between calling and called parties.

Associated with the multi-carrier telecommunications environment is the NB/BB Signaling System 7 (SS7) signaling network/Integrated Services Digital Network (ISDN) 26. The NB/BB SS7/ISDN signaling network operates under a message and protocol standard defined in ITU-T Q-series for SS7 protocol for NB/BB interworking. The NB/BB SS7/ISDN signaling network 26 enables call control in the PSTN 20 and provides access to routing information available in service control points (SCP) 34 for wireline services and home location registers (HLR) 36 for wireless services, for example. Signaling message exchanges are also enabled through NB/BB ISDN interfaces, 38, 40, which enable signaling, and service message exchanges between TDM/ATM gateway 28 and IP gateway 42.

As is well understood, the PSTN 20 provides voice and voice grade data services to a plurality of customers 50 using Service Provider switches 44 (hereinafter, SP switches 44) which include wireline and wireless SP switches which operate under a plurality of operating protocols, well known in the art. The SP switches 44 have a line side and a trunk side. The line side supports a plurality of subscriber lines 46 while the trunk side supports a plurality of interoffice trunks 54. SP switches communicate through NB/BB SS7/ISDN network 26 via signaling links 52. The customer's 50 access the network through wireline telephones 48, wireless telephones 50, and other equipment such as personal computers (not illustrated). Maintenance personnel using service management system (SMS) workstations 56 provide maintenance of the PSTN 20. The maintenance personnel access SP switches 44 through a data network 58, which may be a Wide Area Network (WAN), for example.

As is well known, the IP network 22 includes a plurality of intelligent network elements (INEs) such as routers and servers (not illustrated). Services are provided to a plurality of IP customers 60 by a plurality of Internet Service Providers (ISPs) 62. The IP customer's 60 access services using, for example, IP telephones 64, wireless telephones 50, or personal computers (PCs) 66. Multi-carrier network services from IP network 22 are provided through the IP gateways 30, 42 in a manner well known in the art. ISP management personnel using ISP management workstations 68, also in a manner well known in the art perform management of the IP network.

In the multi-carrier network shown in FIG. 1, the SP switches, gateways and other intelligent network components are collectively referred to as Intelligent Network Elements (INEs).

Webtone Test Service Call with Travelling Log Implementation

To enable the implementation of a Webtone Test Service Call with Travelling Log in the Webtone services network environment, two optional parameters are embedded in the entire service call-related control and data transfer (payload/bearer) signaling messages (such as call-related establishment, data transfer (payload/bearer), query request/response and teardown signaling messages) . The first parameter is the Test Service Call Parameter that flags the service call as a "Test Service Call" and turns off customer alerting and charging. The second parameter is the Travelling Log that collects service-related data from the INEs in the call path. An originating INE (wireline or wireless SP switch 44) initiates the Test Service Call for a subscriber line 46 (or Directory Number (DN)). The originating INE then activates the Test Service Call Parameter on the subscriber line 46, and sets up a Travelling Log for collection of selected service data. The INEs in the multi-carrier telecommunications networks in the call path recognize the Test Service Call Parameter and activate the collection of the requested service related data in the Travelling Log. The protocols for the NB/BB SS7 signaling network and the data transfer (payload/bearer) signaling over ATM/IP/SONET that permit INE interactions within next generation networks, form a basis for the Webtone Test Service Call with Travelling Log requirements.

The Webtone Test Service Call with Travelling Log function will, at a given INE, determine if the service call is a Test Service call (i.e., a service call-related control signaling or service query request/response, or data transfer signaling message, which includes the Test Service Call Parameter) . The Test Service Call Parameter flags the call as a Test Service Call and the Travelling Log collects data from originating, intermediate, and terminating INEs along the service call path.

The Webtone Test Service Call with Travelling Log functions enabled on INEs include:

a) the ability to identify the INE that is the requester of the Webtone Test Service Call with Travelling Log, and identify a service provider responsible for the Webtone Test Service Call designation at network ingress;

b) determine whether a Webtone Test Service Call identifier is active and suppress alerting so as to avoid unnecessary interruptions to the called party;

c) specify the date and time that should be used by an INE when making time-dependent flexible call processing decisions;

d) propagate the Test Service Call Parameter and Travelling Log along the Test Service Call path (including back to the originating INE), as required; and e) set up, modify, change or activate the Test Service Call Parameter and the Travelling Log for a subscriber troubled service or Directory Number (DN)).

None of the Test Service Call Parameters and Travelling Log service-related data selection attributes will be modified by any of the INEs to which the Test Service Call Parameter and Travelling Log are propagated. Each of the originating, intermediate and destination INEs in the subscriber troubled service call path add the requested data to the Travelling Log data entries area. An originating INE uniquely identifies the Travelling Log, generates Travelling Log entries and maintains Travelling Log entries received from the INEs on the service call path. It also controls how Travelling Log entries are reported to a network management personnel designated operations channel. The originating INE classifies the Webtone Test Service Call on Test Service Call initiation into three categories:

Non: if an INE is not permitted to designate a Service call as a Webtone Test Service Call;

Intra-network: if only service calls within the same carrier-network are permitted to be designated as Webtone Test Service Calls; and Inter-network: if any service call is permitted to be designated as a Webtone Test Service Call.

The classification of the Webtone Test Service Call on initiation of a Test Service Call is required because it is anticipated that next generation networks (NGNs) will be used to support services that potentially involve multiple carriers in either the originating and/or the terminating portion of a single service call. Each such carrier may offer access to intelligent peripheral, service control point, wireline, wireless, ATM/IP switches, or services gateway capabilities. Access to a carrier service call processing and applications capability is based on individual agreements between the carriers. Such agreements may or may not permit the origination of Webtone Test Service Calls on a carrier switching network and/or propagation of Travelling Log data entries across the network.

A Test Service Call Parameter is sent to mark and trace Webtone Test Service Calls and activate the collection of data in the Travelling Log from the INEs in the service call path. The Test Service Call Parameter attributes are set up by the originating INE and are not modified by any of the INEs to which they are propagated. An active Test Service Call Parameter on a Webtone service call indicates that the call is a Test Service Call. The Test Service Call Parameter contains information required for Webtone Test Service Call functionality. The attributes indicate whether called party alerting should be performed; whether a Webtone Test Service Call identifier is active; whether a Travelling Log should be generated; or whether an internal log on the network element should be generated. A Travelling Log Identifier identifies the Travelling Log relevant to a specific Test Service Call and a scheduled time and dates for an originating INE that should be used when processing the Test Service Call.

Travelling Log entries are collected from INEs on the service call path when a Test Service Call Parameter is activated on the Test Service Call. Each INE adds data relevant to the Test Service Call in the Travelling Log. The Travelling Log contains attributes that include a Travelling Log Identifier that identifies the Travelling Log relevant to a specific Test Service Call; a direction indicator that identifies the message direction relative to the originating INE (e.g., forward or reverse), a selector indicator that stores a value identifying the data to be collected for the Test Service Call; an INE address that identifies the INE that is supplying a Travelling Log entry; a data field for Travelling Log entries that collects the Travelling Log entry specified by the selector indicator; and a fault code that specifies a value indicative of a fault encountered which caused the Test Service Call to fail.

Webtone Services

The emerging multi-carrier telecommunications network provides a wide range of telecommunications services, including telephony, facsimile, e-mail, data transfer, Internet, World Wide Web, e-commerce, and remote access to business services. Access to these telecommunications services is also being offered through many alternate carriers besides the PSTN. For example, the PSTN customer 50 (FIG. 1) may place a call to the Internet Phone™ 64 by dialing a directory number of the IP phone. SP switch 44 decodes the directory number and routes the call to the carrier network 24 via the TDM/ATM gateway 28. The call is routed through the PSTN 20, using NB SS7 control signaling messages well known in the art. On receipt of the dialed directory number, SP switch 44 consults its call routing tables, or queries SCP 34, and determines that the call request should be passed to IP GWY 30. The IP GWY 30 translates the called number into an IP address using known procedures, and creates appropriate control packets that are forwarded through the IP carrier network 70 to the ISP 62. After the customer 60 has accepted the call, voice data from the customer 50 using telephone 48 is passed through SP switch 44, carrier network 24, to the IP GWY 30 which performs protocol conversion, packetizing the voice data into TCP/IP packets. The TCP/IP packets are forwarded through the IP carrier network 70 to the ISP 62. The ISP 62 routes the TCP/IP packets to the Internet Phone™ 64, where it is converted to sound that is presented to the customer 60.

On the return path, the customer 60 speaks into the Internet Phone™ 64, which packetizes the sound into TCP/IP packets that are sent to the ISP 62. ISP 62 routes the TCP/IP packets containing the voice data towards IP GWY 30 through the IP carrier network 70. The TCP/IP packets containing the voice data are read and the IP GWY 30 performs a protocol conversion transmitting the voice data to the carrier network 24. The carrier network 24 routes the voice data to the TDM/ATM GWY 28 where another protocol conversion is performed. The TDM/ATM GWY 28 forwards the voice data to the SP switch 44. SP switch 44 transmits the voice to telephone set 48.

The establishment and maintenance of multi-carrier telecommunications services such as described above may be subject to failure on either the circuit-switched NB/BB telephone network (PSTN) 20 or the packet-switched data network (Internet) 32. Problems that may be encountered on the circuit-switched NB/BB telephone network are, for example: availability of carrier facilities; equipment failures at SP switches, SS7/ISDN, IP GWYs or other network elements in the signaling control path; service related faults (such as wrong subscriber/subscription datafill; errors in routing; errors in service applications; service application overload or blocking; or, the voice path of the connection as it traverses the PSTN 20. On the packet-switched data network 22, a, connection may fail or perform unsatisfactorily due to: unavailability of routes to the destination; packet buffering at intermediate nodes in the IP carrier network 70, or at the ISP provider 62; or, queuing delays at any of the network INES. Any of the above may result in a disrupted Webtone service or a degradation of the Quality-of-Service of the Webtone service.

Webtone Services Troubleshooting

A Test Service Call with Travelling Log can be initiated from an originating INE (e.g., wireline or wireless SP switch) in the PSTN 20 using the management service workstation 56 to troubleshoot Webtone telecommunications services described with reference to FIG. 1. Network management personnel initiate a Test Service Call with Travelling Logs using data link 72 to the SP switch 44. The Test Service Call Parameter with Travelling Log contained in a control signaling (e.g., broadband ISUP (B-ISUP)) message propagates through the PSTN 20 starting from SP switch 44, and gathers information specified by a Selector Data Indicator attribute in the Travelling Log to test a voice communication session with a VoIP application supported by an IP client 66. The Test Service Call with Travelling Log is initiated from each enabled INE in the path towards the IP GWY 30. The IP GWY 30 adds information to the Travelling Log as the Test Service Call reaches its interface with the PSTN 20. A protocol conversion of the B-ISUP message containing the Test Service Call Parameter and Travelling Log transfers the Test Service Call Parameter and Travelling Log into a TCP/IP packet which is routed towards the IP phone 64 over the Internet 22. The TCP/IP packet with Test Service Call Parameter and Travelling Log routes through the IP carrier network 70 gathering information from each enabled INE in its path and finally reaches the ISP 62. ISP 62 recognizes the IP packet as containing a Test Service Call Parameter and a Travelling Log and may store the Travelling Log as part of tracking and documenting Quality-of-Service provided to the customer 60. The TCP/IP packet containing the Test Service Call Parameter and Travelling Log is forwarded to the IP phone 64. The Test Service Call Parameter and Travelling Log are returned to SP switch 44 in a control signaling message sent in another TCP/IP packet. The return TCP/IP packet propagates back through the IP carrier network 70 towards the IP GWY 30 where it undergoes protocol conversion to a B-ISUP control signaling message which is returned to the PSTN 20. The B-ISUP control signaling message propagates back to SP switch 44 where it is stored pending inspection by the management support personnel. As a final step, the management supports personnel using management workstation 56 retrieve and inspects the contents of the Travelling Log entries in each control or data transfer (payload/bearer) signaling message.

The troubleshooting of Webtone services can also be initiated from the Internet 22 to the PSTN 20. Network management personnel, using a management workstation 68 connected to the ISP 62, initiate a Test Service Call with Travelling Log from ISP 62 using a subscriber number served by SP switch 44, for example. The Test Service Call may be initiated, for example, using a Test Service Call application, which runs on management workstation 68. The Test Service Call application may provide a Graphical User Interface (GUI) 69. The GUI 69 provides, for example, a menu of options for specifying the Test Service Call Parameter with Travelling Log. It may also provide a menu of options for storing and displaying Test Service Call troubleshooting results. A TCP/IP control or data transfer (payload/bearer) packet containing a Test Service Call Parameter and Travelling Log is sent from ISP 62 over the IP carrier network 70 towards IP GWY 30. The TCP/IP packet collects information in the Travelling Log. IP GWY 30 performs a protocol conversion from the TCP/IP protocol to the SS7 signaling network protocol in which it transfers the Test Service Call Parameter and the Travelling Log from the TCP/IP packet to a B-ISUP message. The B-ISUP message containing the Test Service Call Parameter and Travelling Log propagates through the PSTN 20 collecting information from enabled network nodes on a path towards SP switch 44. Upon reaching SP switch 44, the final entry that is required to complete the Travelling Log is posted. SP switch 44 then reverses the propagation direction bit in the header of the Travelling Log and returns a B-ISUP message towards ISP 62 through the PSTN 20 and the data network 22. On receiving the TCP/IP packet with the Travelling Log, the ISP 62 stores the Travelling Log. The management support personnel retrieve the Travelling Log stored by the ISP 62 to inspect it.

Figure 2:
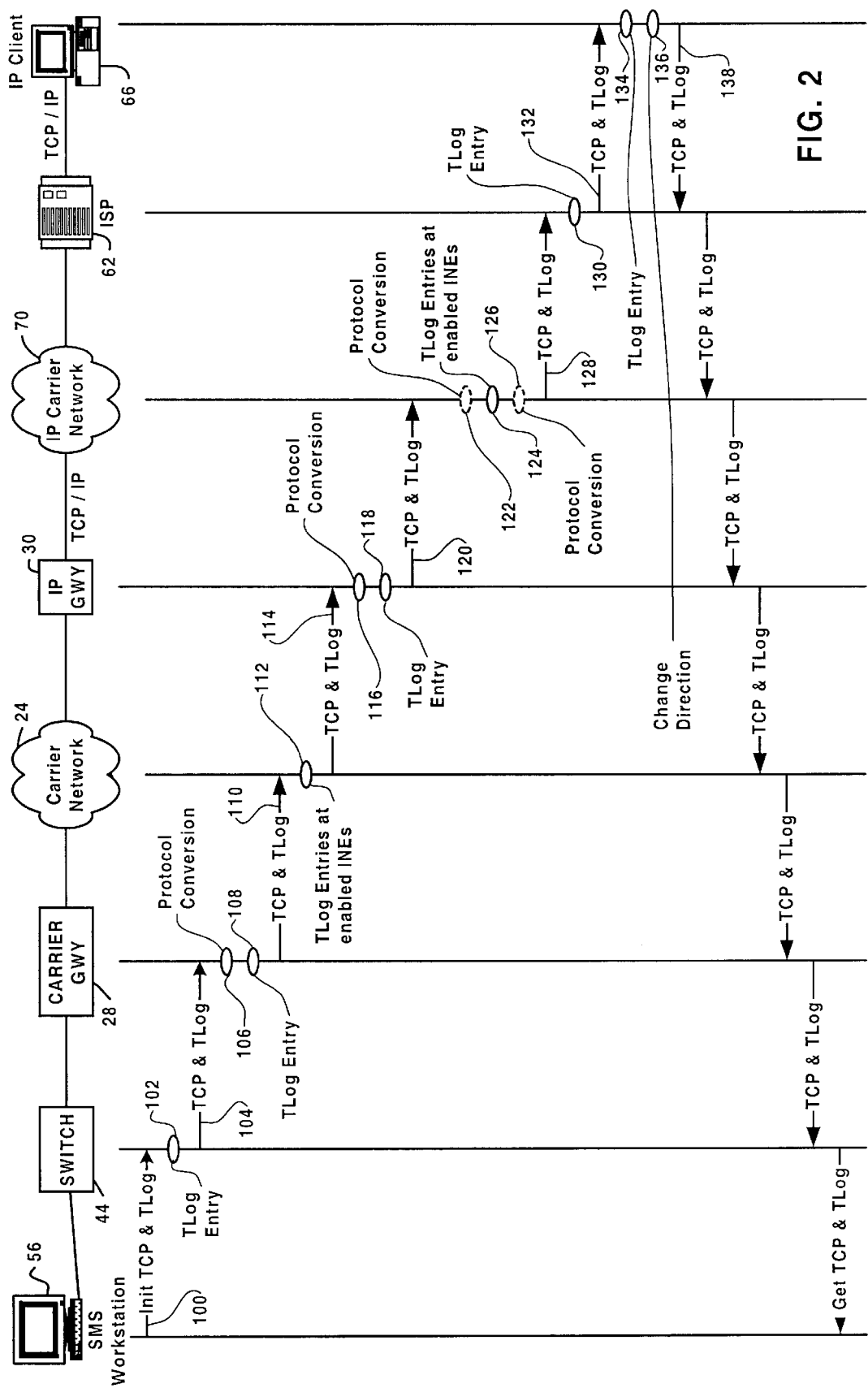
FIG. 2 is a process diagram showing the information flow for a Test Service Call with Travelling Log across a multi-carrier network initiated by network management personnel for troubleshooting a telecommunications service in a multi-carrier network.

FIG. 2 is a process diagram showing the steps involved in collecting information for troubleshooting purposes for Webtone services in accordance with the invention. In initiating a Test Service Call with the Travelling Log from the PSTN 20, network management personnel using management workstation 56 initiate a Test Service Call with Travelling Log from the SP switch 44 in step 100. The initiation of the Test Service Call with the Travelling Log involves the creation of a B-ISUP control signaling message, typically an Initial Address Message (IAM), containing a Test Service Call Parameter and a Travelling Log. The Test Service Call Parameter is configured to suppress charging information and called party alerting. The Travelling Log is configured to request specific information from enabled network elements. A Test Service Call Application from which network management personnel operate a graphical user interface to indicate a nature of the telecommunications service requiring troubleshooting may automatically specify the Test Service Call Parameter. The graphical user interface 57 may include, for example, a menu of Test Service Call options as well as a menu for selecting how Test Service Call results are displayed. Following specification of the Test Service Call Parameter and Travelling Log, the IAM message is transmitted as any other B-ISUP control signaling message in the NB/BB SS7 signaling network 26 (FIG. 1). As the IAM is routed through the PSTN 20, it traverses the Carrier GWY 28. The Carrier GWY 28 may be required to perform protocol conversion (step 106). The Carrier GWY 28 also posts an entry to the Travelling Log (step 108). The Carrier GWY 28 forwards the IAM message to the carrier network 24 in step 110. A Travelling Log entry is posted in the Travelling Log of the B-ISUP signaling message in step 112 by each enabled INE in the carrier network 24. The carrier network 24 may be implemented, for example, as an Asynchronous Transfer Mode (ATM), Synchronous Optical Network (SONET) or IP carrier, as is well understood in the art. The Test Service Call with Travelling Log is routed to an edge of the carrier network 24 associated with IP GWY 30. Edge network elements of carrier network 24 send the message with the Test Service Call Parameter and Travelling Log to IP GWY 30 in step 114.

IP GWY 30 is responsible for bridging communications sessions between the PSTN 20 and the Internet 22. When the message containing the Test Service Call Parameter and Travelling Log reaches the IP GWY 30, the IP GWY 30 performs a protocol conversion of the message with Test Service Call Parameter and Travelling Log into a TCP/IP packet containing the Test Service Call Parameter and the Travelling Log in step 116. The IP GWY posts a Travelling Log entry in the Travelling Log (step 118). The TCP/IP packet is then routed to the IP carrier network 70 in step 120. The IP carrier network may be implemented as an ATM backbone, a SONET backbone, an IP with Quality-of-Service backbone or any other packet carrier protocol that provides Quality-of-Service. As the TCP/IP packet enters the IP carrier network 70, it may undergo protocol conversion (optional step 122) in order to be understood by the INEs of the IP carrier network 70.

As the TCP/IP packet containing the Travelling Log is transferred through the IP carrier network 70, Travelling Log entries are posted at each intermediate enabled INE through which it is passed (step 124). On reaching an edge of the IP carrier network 70 adjacent the ISP 62, the TCP/IP packet may undergo a further protocol conversion in optional step 126. Edge equipment in the IP carrier network 70 transfers the TCP/IP packet containing the Test Service Call Parameter and Travelling Log in step 128 to ISP 62. ISP 62 posts a Travelling Log entry in step 130. Finally, the TCP/IP packet is transferred to the PC 66, which is the destination point (step 132). The Test Service Call Parameter disables customer notification so the customer 60 is not disturbed. The PC 66 also posts a Travelling Log entry in step 134 and changes a data bit in the Travelling Log header that specifies the direction in which the message containing the Travelling Log entries is propagated (step 136). Subsequently, the TCP/IP packet is transferred from PC 66 in step 138 and routed back towards SP switch 44. The ACM (Address Complete Message) and other control signaling messages follow through similar events. When a Webtone Test Service Call is established, entries are posted to the Travelling Log in the service data transfer signaling messages. The Travelling Log entries from all service call-related messages are analyzed by an operations support system to determine where trouble was encountered and the cause of the trouble.

Customer Initiated Webtone Services Troubleshooting

As the next generation multi-carrier network evolves, it is evident that the number of subscribers as well as the number of services offered will increase exponentially. Consequently, it is considered prudent and cost effective to permit customers to launch a Test Service Call when they are experiencing trouble completing a telecommunications service session.

Figure 3:
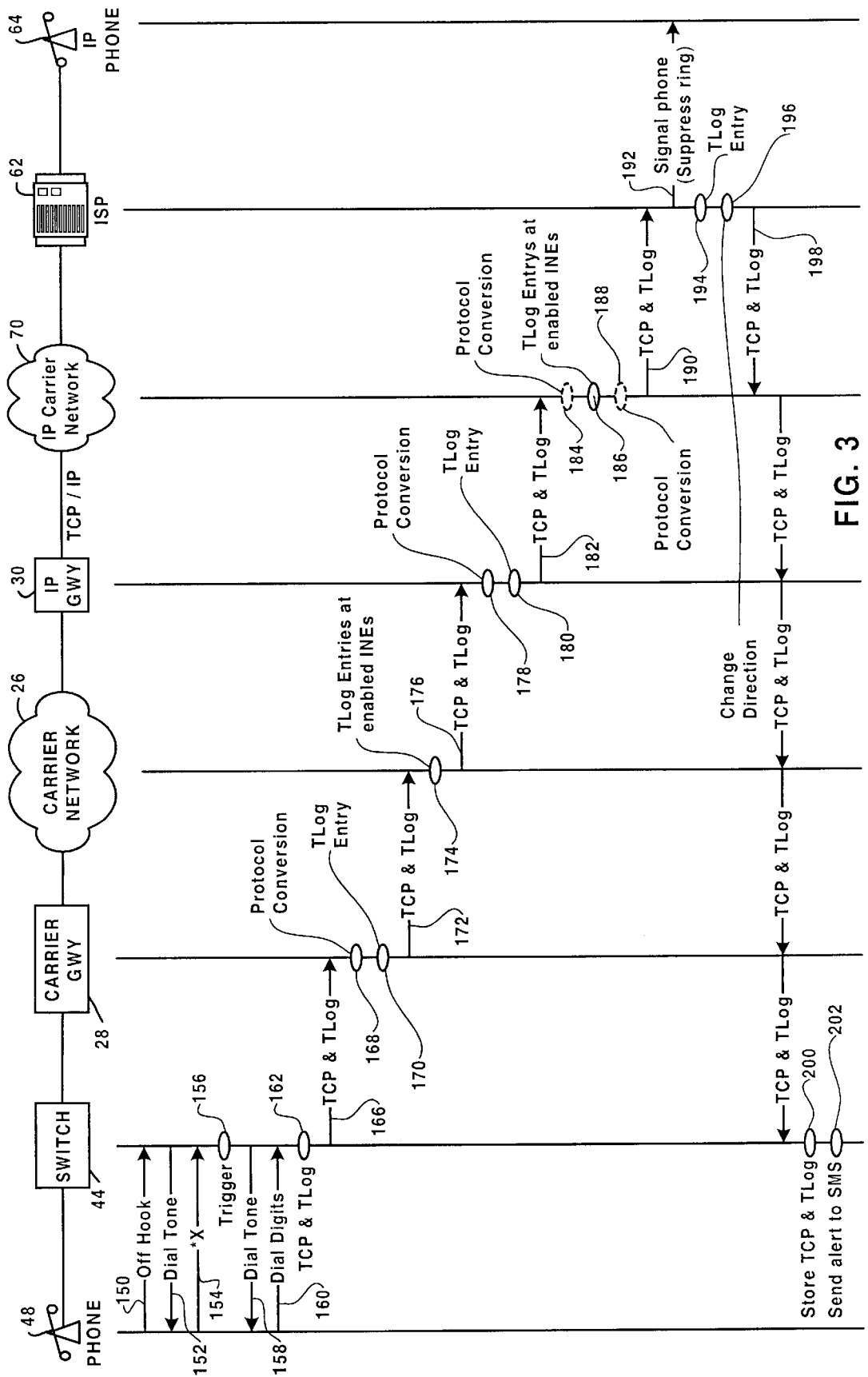
FIG. 3 is a process diagram showing the information messages flow for a Test Service Call with Travelling Log initiated by a customer for troubleshooting a telecommunications service in a multi-carrier network.

FIG. 3 illustrates an example of customer-initiated troubleshooting in which the customer 50 (FIG. 1) of the PSTN 20 has experienced difficulty establishing a telecommunications service call with the Internet telephone of the IP customer 60. In order to provide quality assurance in a cost-effective manner, the multi-carrier network shown in FIG. 1 enables customer-initiated troubleshooting.

As shown in FIG. 3, the customer 50, using telephone 48 launches a Test Service Call with Travelling Log, which is made available on the multi-carrier network as a fee service. To initiate the service, the customer 50 takes telephone 48 off-hook (step 150). On detecting the off-hook condition, the SP switch 44 applies dial tone to the line (step 152) and the customer 50 dials a predetermined digit sequence, for example, "*X" (step 154). On translation of the dialed digits, a trigger 156 alerts the SP switch 44 that the customer is requesting the launch of a Test Service Call. The SP switch signals the caller to input information required for the service, for example, by supplying a second dial tone in step 158. On receipt of the signal, the customer 50 enters the information required to initiate the Test Service Call in step 160. In this example, the customer 50 enters the IP telephone number using a dial pad of the telephone 48. The SP switch 44 collects the DMTF tones generated when the customer dials the Internet telephone number and converts the DTMF tones to digits which are stored in a call-related control signaling message containing a Test Service Call Parameter and a Travelling Log in step 162. In accordance with the predefined troubleshooting service, the SP switch 44 consults routing tables and determines that the call-related control signaling message should be addressed to the IP GWY 30.

The SP switch 44 then forwards the call-related control signaling message in step 166 to the Carrier GWY 28 which performs the protocol conversion in step 168 and posts an entry to the Travelling Log in step 170. The Carrier GWY 30 then forwards the call-related control signaling message to an edge device in the carrier network 26 in step 172. Enabled INEs in the carrier network 26 post entries in the Travelling Log as the call-related control signaling message traverses the carrier network 28 (step 174). An edge INE forwards the call-related control signaling message to the IP GWY in step 176. On receipt of the call-related control signaling message, the IP GWY 30 performs a protocol conversion if required, in step 178. The IP GWY 30 posts an entry into the Travelling Log (step 180) of the call-related control signaling message in accordance with the Selector Data Indicator attribute in the Travelling Log of the message. The IP GWY 30 also determines, using address translations well known in the art, that the call-related control signaling message should be addressed to the ISP 62. The IP GWY 30 therefore forwards the packet in step 182 to the IP Carrier Network 70. Conversion at an edge of the IP Carrier Network may be required (step 184), as explained above.

Enabled INEs in the IP Carrier Network 70 post entries to the Travelling Log as required by the Travelling Log Selector Data Indicator attribute in the call-related control signaling message (step 186). Protocol conversion may also be required (step 188) at the edge of IP Carrier Network 70 adjacent ISP 62. The IP Carrier Network 70 forwards the TCP/IP packet containing the Test Service Call Parameter and Travelling Log to the ISP 62 (step 190). The Test Service Call Parameter alerts the ISP 62 that the call is a Test Service Call with billing and customer alerting disabled. The ISP 62 therefore signals the IP phone 64 to verify whether a communications service call can be started, but disables ringing (step 192) so that the customer 60 is not disturbed. The ISP 62 also inspects the Selector Data Indicator attribute in the Travelling Log to determine what information is to be retrieved, and posts the information to the Travelling Log (step 194) and reverses the Travelling Log Direction Indicator (step 196), as described above. The ISP 62 returns a TCP/IP packet containing the Test Service Call Parameter and Travelling Log through the IP Carrier Network 70 to the IP GWY 30 (step 198). The IP GWY 30 performs any protocol conversation required to convert the TCP/IP packet to a call-related control signaling message, which is returned to the SP switch 44.

On receipt of the returned call-related control signaling message, the SP switch 44 extracts the information gathered in the Travelling Log and stores it (step 200) pending retrieval of the information by network management personnel. The SP switch 44 then prepares and forwards an alert message to management personnel (step 202) to advise that a Test Service Call has been completed. The SP switch 44 may also optionally advise the customer 50 that the Test Service Call was completed successfully. Network management personnel subsequently retrieve the information stored on SP switch 44 and analyze it to locate and correct any malfunction reported in the Travelling Log.

Webtone Network Information Gathering

The methods and apparatus in accordance with the invention may also be used for multi-carrier information gathering by which customers of services offered on any platform in the multi-carrier network may gather information from databases or other network elements that may be accessed from the same carrier or any other carrier in the multi-carrier network, as described in Applicant's co-pending U.S. patent application Ser. No. 09/354,728 filed on Jul. 16, 1999 and entitled CUSTOMER SMART LOGGING FOR NEW TELECOMMUNICATIONS SERVICES, the specification of which is incorporated herein by reference in its entirety.

Persons skilled in the art will understand that there is no practical limit on the number of services that may be implemented across multiple carriers and multiple vendor equipment using the methods and apparatus in accordance with the invention. The methods and apparatus in accordance with the invention permit troubleshooting information gathering for any network element that can be addressed by NB/BB SS7/ISDN signaling network, as well as NB and BB ISDN Primary rate Interface (PRI), and others.

The examples presented above are intended only for a clear demonstration of the invention without limiting the scope of the appended claims.

I claim:

1. A method of enabling troubleshooting a multi-carrier telecommunications network, comprising the steps of:
   generating a call-related signaling message for a telecommunications service in the multi-carrier network, and initializing the call-related signaling message with a Test Service Call Parameter;
   initiating the telecommunications service using the call-related signaling message; and
   obtaining a Travelling Log of information posted by enabled Intelligent Network Elements (INEs) to which the call-related signaling message containing the Test Service Call Parameter and the Travelling Log is routed, whereby the information posted to the Travelling Log by any of the enabled INEs is determined by attributes of the call-related signaling message.

2. A method as claimed in claim 1 wherein the call-related signaling message is one of a control or a data transfer (payload/bearer) message.

3. A method as claimed in claim 2 wherein the call-related control or data transfer (payload/bearer) signaling message propagates across the carrier networks and is converted to an appropriate protocol, if required, at gateways or interfaces between the carrier networks traversed by the Test Service Call.

4. A method as claimed in claim 3 wherein the Travelling Log is stored in the call-related control or data transfer (payload/bearer) signaling message and travels with the signaling message as a part of the call-related control or data transfer (payload/bearer) signaling message.

5. A method as claimed in claim 4 wherein information is posted to the Travelling Log by each enabled INE to which the call-related control or data transfer (payload/bearer) signaling message is passed.

6. A method as claimed in claim 1 wherein the attributes of the call-related signaling message are stored in a Selector Data Indicator in the Travelling Log.

7. A method as claimed in claim 1 wherein network management personnel initiate the Test Service Call from a service management system in the multi-carrier network.

8. A method as claimed in claim 7 wherein the network management personnel is presented with a menu of options when initiating the Test Service Call, and a selection from the options determines the information to be retrieved by the Test Service Call.

9. A method as claimed in claim 8 wherein the options further provide the network management personnel with a selection of a format for displaying the information retrieved by the Test Service Call.

10. A method as claimed in claim 1 wherein a customer of a service provider providing service in the multi-carrier network initiates the Test Service Call.

11. An Intelligent Network Element for enabling a Test Service Call for troubleshooting in a multi-carrier network, comprising:
    a Test Service Call capability for determining whether a call-related signaling message received by the Intelligent Network Element (INE) is associated with a Test Service Call for retrieving information related to a telecommunications service associated with the call-related signaling message, and for posting information to a Travelling Log in the call-related signaling message to provide information in accordance with an attribute contained in the call-related signaling message if the signaling message is determined to be associated with the Test Service Call, the Test Service Call Parameter being specified by management personnel, a customer of the multi-carrier network, or by an event initiated by the management personnel or the customer.

12. The Intelligent Network Element (INE) as claimed in claim 11 wherein the call-related signaling message is a control or data transfer (payload/bearer) signaling message.

13. The Intelligent Network Element (INE) as claimed in claim 11 wherein the attribute of the signaling message is stored in a Selector Data Indicator.

14. An Intelligent Network Element (INE) as claimed in claim 11 wherein the INE is further enabled to initiate the Test Service Call in response to a request by the management personnel or the customer, and the INE formulates the call-related signaling message containing the Test Service Call Parameter and Travelling Log.

15. An Intelligent Network Element (INE) as claimed in claim 14 wherein the Test Service Call capability is further enabled to present information retrieved by the Test Service Call to the management personnel or the customer in a comprehensible format.

16. An Intelligent Network Element (INE) as claimed in claim 15 wherein the format is specified by the management personnel or the customer at a time that the Test Service Call Parameter is specified.

17. A multi-carrier telecommunications network for enabling troubleshooting to provide and ensure service quality assurance, comprising:
    a plurality of interconnected carrier networks, Intelligent Network Elements (INEs) of each carrier network being provisioned with a Test Service Call capability for determining whether a message associated with a telecommunications service delivery through one or more of the carrier networks is associated with a Test Service Call for retrieving troubleshooting information from the multi-carrier telecommunications network, and for posting information to a Travelling Log that is forwarded along a call-related signaling path and returned to an originating INE, if the message is determined to be associated with the Test Service Call.

18. A multi-carrier telecommunications network as claimed in claim 17 wherein the network delivers services and the Test Service Calls are used by network management personnel to troubleshoot the services by gathering information from Intelligent Network Elements in the multi-carrier network through which the services are delivered.

19. A multi-carrier telecommunications network as claimed in claim 18 wherein a telecommunications service call-related signaling message associated with a Test Service Call initiated in an Intelligent Network of one carrier in the multi-carrier network is converted to a protocol used by an adjacent Intelligent Network Element of another carrier when the telecommunications service call-related signaling message passes through a gateway or an interface between two carriers that operate under different network protocols.

20. A multi-carrier network as claimed in claim 17 wherein the carrier networks operate under any network protocol adapted to enable the call-related signaling message of the Test Service Call.

21. A multi-carrier network as claimed in claim 20 wherein the network protocols include:
   Time Division Multiplexing (TDM);
   Asynchronous Transfer Mode (ATM);
   Synchronous Optical Network (SONET);
   Internet Protocol (IP); and
   Narrowband/broadband Integrated Services Digital Network (ISDN).

22. An intelligent network element (INE) adapted to enable retrieval of troubleshooting information from a multi-carrier network adapted to provide telecommunications services, comprising:
   means for providing a Test Service Call capability for determining whether a telecommunications service call-related signaling message is associated with a Test Service Call;
   means for interpreting a Test Service Call Parameter in the message to flag the call as Test Service Call;
   means for examining attributes contained in the call-related signaling message to determine what information is to be posted to a Travelling Log in the message; and
   means for posting the information to the Travelling Log in the message in accordance with a selector data indicators attribute in the Travelling Log.

23. An Intelligent Network Element (INE) as claimed in claim 22 wherein the attributes contained in the call-related signaling message are stored in a Selector Data Indicator of the call-related signaling message.

24. An Intelligent Network Element (INE) as claimed in claim 22 further comprising:
   means for extracting information posted to the Travelling Log of the message; and
   means for presenting the information via a predetermined communications medium in a human comprehensible form to network management personnel.

25. An Intelligent Network Element (INE) as claimed in claim 24 further comprising:
   means for storing information accumulated in the Travelling Log; and
   means for delivering the stored information to the network management personnel troubleshooting a multi-carrier telecommunications services.

26. A computer readable memory containing computing machine executable instructions for an Intelligent Network Element (INE) in a multi-carrier telecommunications network, comprising:
   instructions for providing a Test Service Call capability for determining whether a telecommunications service call-related signaling message is associated with a Test Service Call for retrieving troubleshooting information from the INE;
   instructions for interpreting a Test Service Call Parameter and Travelling Log selector data indicators attribute in the message to flag the service call as a Test Service Call and to determine what information is to be retrieved from the INE; and
   instructions for posting the information to a Travelling Log in the message.

27. The computer readable memory as claimed in claim 26 further comprising:
   instructions for extracting information from the Travelling Log of a Test Service Call; and
   instructions for storing the information pending retrieval by network management personnel.

28. A computer readable memory as claimed in claim 26 further comprising:
   instructions for retrieving stored information extracted from the Travelling Log; and
   instructions for delivering the stored information to network management personnel troubleshooting a multi-carrier telecommunications service call.

* * * * *